United States Patent [19]

Cromeens

[11] 3,750,513
[45] Aug. 7, 1973

[54] TELESCOPING ARBOR ASSEMBLY

[75] Inventor: Jeff Y. Cromeens, Mesquite, Tex.

[73] Assignee: Industrial Woodworking Machine Co., Inc., Garland, Tex.

[22] Filed: May 15, 1972

[21] Appl. No.: 253,277

[52] U.S. Cl................. 83/425.4, 83/433, 83/498, 83/499, 83/665
[51] Int. Cl............................................. B27b 5/34
[58] Field of Search................. 83/433, 478, 499, 83/504, 665, 425.2, 425.3, 425.4

[56] References Cited
UNITED STATES PATENTS

| 3,630,244 | 12/1971 | Cromeens | 83/665 X |
| 2,699,338 | 1/1955 | Rue et al. | 83/665 X |

Primary Examiner—Andrew R. Juhasz
Assistant Examiner—Leon Gilden
Attorney—Schley & Schley

[57] ABSTRACT

A telescopic arbor assembly for a gang of ripping saws disposed between a pair of edgers and secured to the adjacent ends of telescopic shafts of progressively inward increasing length supported by and having slidable driving connection with a longer rotatable axle. One of the edgers is relatively fixed and mounted on a cup-shaped member adapted to contain the saws when the latter are retracted out of operative position whereby the number of saws exposed to the lumber to be ripped may be varied. The other edger is movable with and/or relative to the saws as well as relative to the relatively fixed edger.

6 Claims, 3 Drawing Figures

Patented Aug. 7, 1973 3,750,513

TELESCOPING ARBOR ASSEMBLY

SUMMARY OF THE INVENTION

This invention relates to a novel telescopic arbor assembly having a plurality of saws disposed between a pair of edgers for ripping lumber that requires variation between the widths of the cuts due to defects, such as knots, therein. One of the edgers is relatively fixed against longitudinal movement, while the saws and other edger are mounted on the adjacent ends of telescopic shafts of progressively outward decreasing length which have one of their end portions supported by a rotatable center shaft or axle and which have slidable connection with common drive means. The relatively fixed edger is mounted on a cup-shaped head which provides a chamber or recess for containing the saws when the latter are retracted out of operative position whereby the number of saws exposed to the lumber may be varied without rendering the fixed edger inoperative.

A construction designed to carry out the invention will be described hereinafter, together with other features thereof.

DESCRIPTION OF THE PREFERRED EMBODIMENT

Figure 1:
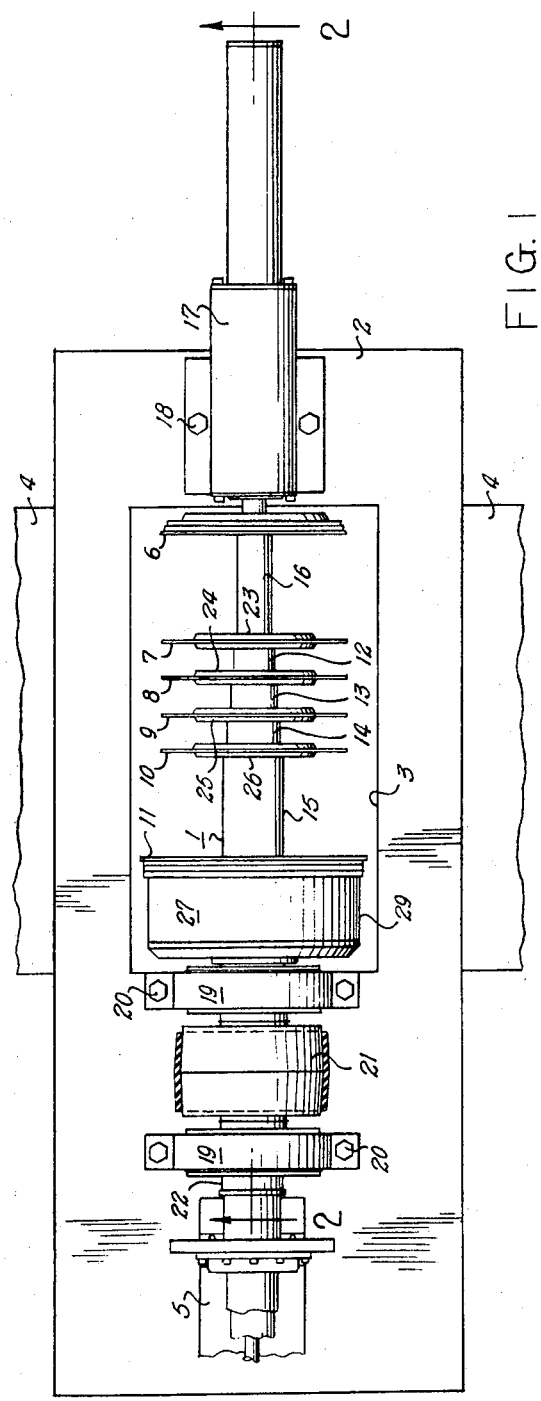
FIG. 1 is a top plan view of a telescopic arbor assembly, constructed in accordance with the invention, for a gang of ripping saws disposed between a pair of edgers.
Figure 2:
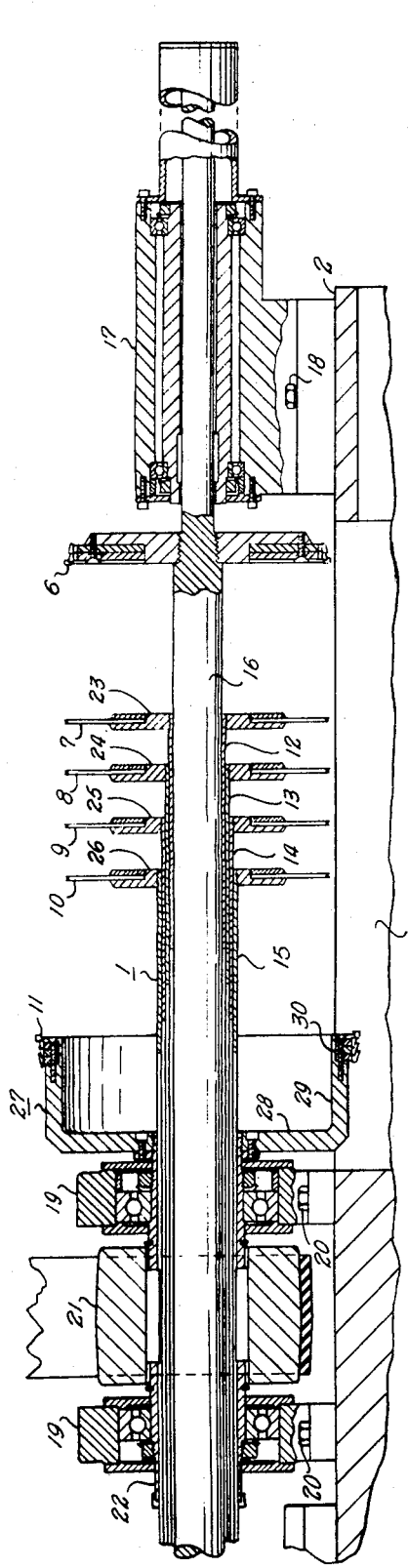
FIG. 2 is an enlarged longitudinal sectional view of the assembly taken on the line 2—2 of FIG. 1.

In the drawing, the numeral 1 designates a telescopic arbor assembly embodying the principles of the invention and mounted on an elongate, horizontal, rectangular base or frame 2 having an elongate rectangular sawdust opening 3 extending longitudinally of its right portion. A pair of opposed tables, portions of which are shown at 4 in FIG.1, extend transversely from the right portion of the base 2 for slidably supporting lumber during the ripping thereof. The arbor assembly extends longitudinally of and is mounted on the base in medial overlying relation to its sawdust opening 3 and is adapted to be operated by suitable mechanism, a portion of which is illustrated at 5 and which is fully disclosed in Cromeens etal. U.S. Pat. No. 3,630,244. In addition to a plurality of rotary transversely extending cutters 6, 7, 8, 9, 10 and 11, the assembly 1 includes a plurality of longitudinal telescopic tubular shafts or tubes 12, 13, 14 and 15 of progressively decreasing length outwardly and having the cutters mounted on their right ends. An axle or solid center shaft 16, of greater length, has the innermost longest shaft or tube 12 telescoped thereon. It is readily apparent that the number of cutters and their shafts is subject to variation and that any feasible quantity may be provided. For purposes of illustration, six cutters are depicted with the cutters 6 and 11 being in the form of annular edgers and the cutters 7–10 as conventional circular ripping saws.

A bearing 17 upstands from the right end of the base 2 and is secured thereto adjacent the opening 3 by bolts 18 for rotatably supporting the right end of the axle 16. Contiguous the left end of the sawdust opening, a pair of similar spaced bearings 19 are secured to the base by bolts 20 and the left end portions of the axle and the tubular shafts 12–15 extend therethrough. For driving the axle 16 as well as the tubular shafts, a suitable mechanism 21 is provided between the spaced bearings 19 and may be of the pulley and sheave type. Also, the shafts may be slidably connected to the drive mechanism 21 in any suitable manner which does not interfere with relative longitudinal movement therebetween. Preferably, the pair of spaced bearings have journaled therein a sleeve 22 which encircles and is slidably connected to the shortest tubular shaft 15 for supporting a portion of the drive mechanism. None of these features nor the operating mechanism 5 form any part of the present invention.

Figure 3:
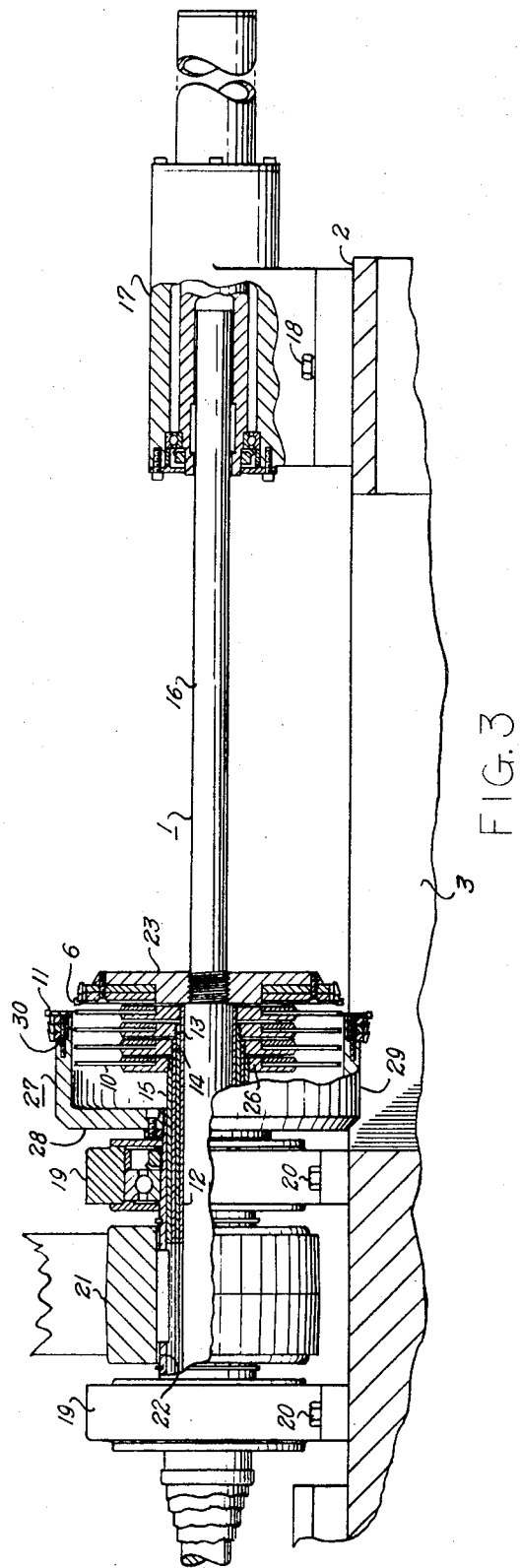
FIG. 3 is a side elevational view, partly in section, of the assembly with the saws retracted.

The edger 6 is of the usual structure and is movable to adjusted positions by longitudinal movement of the axle or solid shaft 16 relative to the other tubular shafts 12–15. Similarly, relative longitudinal movement of the latter shafts adjusts the relative positions of the saws 7–10. Hubs 23, 24, 25 and 26 connect the saws 7–10 to the shafts 12, 13, 14 and 15, respectively, while the edger 11 is mounted on a cup-shaped member or head 27 having a circular end wall or plate 28 screwthreaded on or otherwise fastened to the right end of the sleeve 22. The head 27 has an annular flange or wall 29 extending axially from the periphery of its end wall 28 toward the bearing 15 for supporting the edger 11 on its end face 30 which is complementary to said edger. The internal diameters of the latter edger and the flange 29 are greater than the external diameters of the saws 7–10 so as to permit nesting of said saws within the head as shown in FIG.3, the interior of the head providing a chamber on recess for the saws. Due to this construction, the number of saws exposed to the lumber being ripped may be varied in accordance with the desired width between the rips. When one or more of the saws are not required, they may be tucked within the head 27 so as to simplify ripping of the lumber. In fact, the edger 6 may be nested within the head if so desired.

The foregoing description of the invention is explanatory thereof and various changes in the size, shape and materials, as well as in the details of the illustrated construction, may be made within the scope of the appended claims without departing from the spirit of the invention.

I claim:

1. A telescopic arbor assembly including elongate axle means,
a plurality of telescopic tubular shaft means slidably mounted on and having connection with one another and said axle means for rotation with the latter means and for reciprocal adjustment relative thereto and to one another,
means for rotatably and slidably supporting said axle means and shaft means
said shaft means being of less length than said axle means and of progressive radially outward decreasing length,
rotary cutter means fixedly mounted on adjacent ends of said axle means and shaft means for reciprocal movement therewith relative to said axle means and to one another,
cup-shaped means having slidable connection with the outermost shortest shaft means for rotation therewith and for mounting one of the cutter means thereon, the latter cutter means and cup-shaped means having internal diameters greater than the external diameters of at least one of the other cutter means to permit nesting of the said other cutter means in the cup-shaped means.

and drive means for imparting rotation to said axle means and shaft means.

2. A telescopic arbor assembly as defined in claim 1 wherein the cup-shaped means includes a circular end wall fastened to the outermost shortest shaft means and an annular wall extending axially from the end wall and having its cutter means fixed to the free end of the annular wall.

3. A telescopic arbor assembly as defined in claim 1 wherein the drive means is common to the axle means and all of the shaft means.

4. A telescopic arbor assembly as defined in claim 1 wherein the rotary cutter means fixedly mounted on the shaft means are in the form of circular ripping saws.

5. A telescopic arbor assembly as defined in claim 1 wherein the rotary cutter means fixedly mounted on the axle means and cup-shaped means are in the form of annular edgers.

6. A telescopic arbor assembly as defined in claim 5 wherein the rotary cutter means fixedly mounted on the shaft means are in the form of circular ripping saws.

* * * * *